Jan. 3, 1939.　　　G. ALGARSSON　　　2,142,596
SUPERCHARGER
Filed Aug. 25, 1937　　　3 Sheets-Sheet 1

INVENTOR
Gretter Algarsson
BY
Hanbury A. Budden
ATTORNEY

Jan. 3, 1939.                G. ALGARSSON                2,142,596
                              SUPERCHARGER
                         Filed Aug. 25, 1937          3 Sheets-Sheet 2

INVENTOR
Gretter Algarsson
By
ATTORNEY

Jan. 3, 1939.          G. ALGARSSON          2,142,596
SUPERCHARGER
Filed Aug. 25, 1937          3 Sheets-Sheet 3

INVENTOR
GRETTIR ALGARSSON
By
ATTORNEY

Patented Jan. 3, 1939

2,142,596

UNITED STATES PATENT OFFICE 2,142,596

SUPERCHARGER

Grettir Algarsson, Montreal, Quebec, Canada

Application August 25, 1937, Serial No. 160,893

6 Claims. (Cl. 123—119)

This invention relates to superchargers and particularly those for use with aircraft engines operating at high altitudes, as described in the present specification and illustrated in the accompanying drawings that form part of the same.

The invention consists essentially in the means for maintaining a full volume of air supply to an engine at constant pressure regardless of external air pressure which decreases with increased altitude, as pointed out in the claims for novelty following a description in detail of one form of the invention.

The objects of the invention are to maintain in the intake manifold of an engine a constant pressure irrespective of the pressure of the surrounding air, and at the same time consuming the power of the engine as a driving force for the supercharger only in proportion with the increase in pressure and volume of air required.

A further object of the invention is to provide a supercharger which is constantly driven and so automatically controlled as to deliver air in agreement with the changes of barometric pressure of the surrounding air.

A further object is to provide means whereby the capacity of the supercharger is increased or decreased directly with the requirements of the engine for air at constant density.

A further object is to provide means whereby the output of the supercharger is maintained at a predetermined pressure regardless of all variables including variations in R. P. M. of the engine.

In the operation of aircraft, particularly those which are designed for high altitude flying, the performance of the engine at ground level and at rated height presents very serious problems on account of the variation in density of the air between these two levels. The power output of an unsupercharged engine decreases rapidly as the altitude increases. If a single stage supercharger is employed with a single gear ratio, the power consumed by the supercharger will be virtually constant regardless of variations in altitude, resulting in a serious waste of power at less than rated height.

These serious drawbacks have been partly overcome by the use of superchargers which have two or more stages or speeds of operation, involving the use of a change speed gear or clutches whereby the power required to operate the supercharger can be lightened at ground and low levels. Such devices involve a further control to be operated by the pilot and require the exercise of considerable judgement in their use.

In the present invention, the supercharger is constantly running, its speed of rotation being directly in proportion to that of the engine, through a system of gears whose ratio is fixed. The delivery of air through the supercharger is controlled by a device amenable to changes of atmospheric pressure and through the degree of such change to increase or decrease the volume of air taken in by the supercharger, with the consequent consumption of power by the supercharger always in proportion to the needs of the engine for air at constant density.

In the drawings Figure 1 is a vertical section through the centre of the impellers and casings of the supercharger, on the line 1—1 of Figure 2, showing the connecting passageways from the air inlet to the outlet from the supercharger to the engine.

Figure 1:
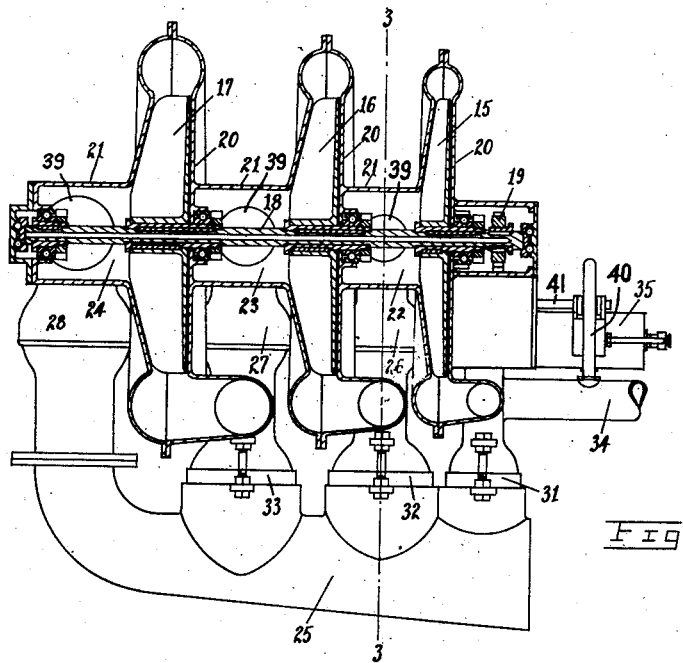
Figure 2:
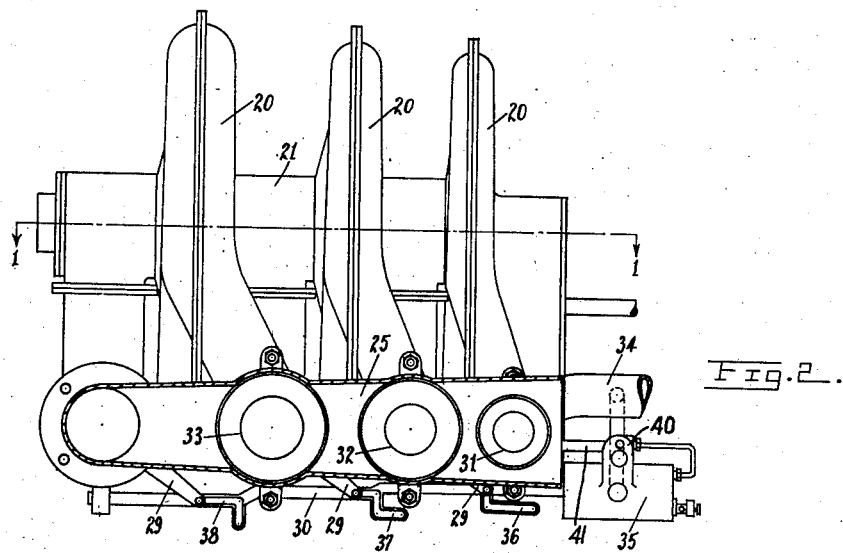
Figure 2 is a plan view looking at the supercharger from below and showing the air inlet manifold cut away to expose the check valves.
Figure 3:
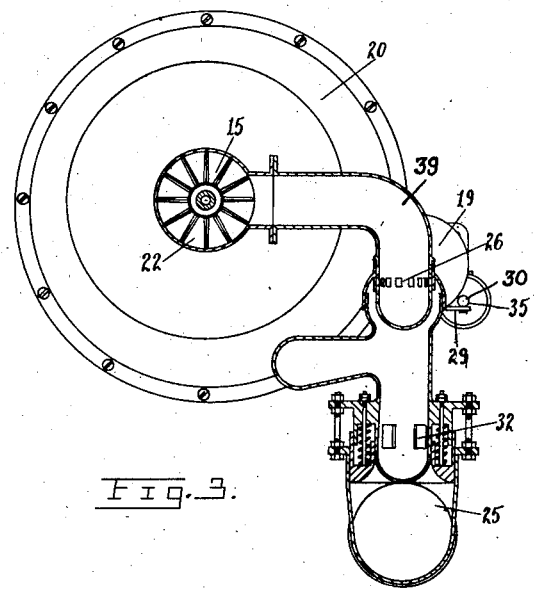
Figure 3 is a vertical cross sectional view on the line 3—3 of Figure 1 showing the relation of the check and throttle valves with the passageways to the impeller casing.
Figure 4:
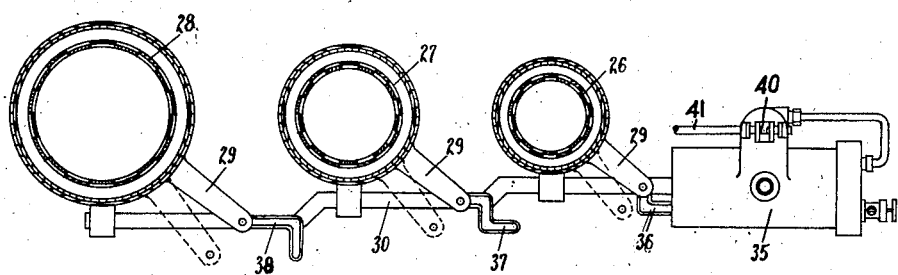
Figure 4 is a horizontal sectional view showing the operating connections between the pressure governed control device and the throttle valves.

Referring to the drawings, the supercharger illustrated has three stages, but any number of stages could equally well be used and for some uses it may be found that a single stage supercharger would be sufficient for the work to be done.

The impellers 15, 16 and 17 are mounted on the shaft 18 which is constantly driven from the engine, but at a much higher speed, through a train of gears 19. The impellers are of orthodox design and are enclosed within the casings 20. Central sleeves 21 connect the casings together. These sleeves between the impellers form the air inlet chambers 22, 23 and 24, each chamber being connected with its corresponding throttle valve 26, 27 or 28 by a duct 39. Throttle valves 26, 27 and 28 control the flow of air to the chambers 22, 23 and 24 respectively and are here shown as of the rotary sleeve type, each having an operating arm 29 terminating in a pin which is confined to a predetermined travel within a slot in a rod 30, hereinafter more fully described.

On the output sides of the impellers there are check valves 31, 32 and 33, each of which is large enough to allow all the air required by the engine to enter, these check valves being so arranged as to allow no air to escape. The check valve 31 is directly connected with the duct 34 leading from the casing of the impeller 15 and any air entering through this check valve does not pass through the supercharger, but is led to the engine direct and constitutes the normal supply of air to the engine when idling on the ground. The air passing through the check valves 32 and 33 is controlled by the throttle valves 26 and 27 respectively, which pass the air to the chambers 22 and 23 and thence to the casings of the impellers 15 and 16. The air passing through the throttle valve 28 is drawn directly from the manifold 25, and fed to the impeller 17.

The throttle valves 26, 27 and 28 are operated by an automatic pressure governed control device 35, acting through the pin and slot rod 30. This pressure governed control device may be of any suitable type such as disclosed in my copending application, Serial No. 160,894 filed August 25, 1937. This control device 35, having a pump 40 constantly driven by the shaft 41 from any suitable connection, is similar in principle to an ordinary aneroid barometric control, but employs a piston and cylinder in place of an aneroid bellows. The pump 40 acts to maintain a substantial vacuum in the cylinder of the device. The device 35 is designed to respond to a selectable "critical" pressure, any variation of the absolute pressure at the discharge end of the supercharger above this "critical" value causes the rod 30, which is directly connected with the piston, to move inwards, thus closing the throttle valves until the pressure is restored to the "critical" value. Variation below the "critical" value results in an outward movement of the rod 30 thus opening the throttle valves and again restoring equilibrium. This control is so arranged that, if the supercharger is delivering air to the engine at a pressure greater or less than a predetermined value, it will automatically close or open the throttles as required until either the desired pressure is restored or the throttles are all open (if the required increase in pressure is beyond the capacity of the supercharger) or all closed (if no increase in pressure is needed).

The pin and slot rod 30 is provided with slots 36, 37 and 38 which are so designed as to provide for the opening of one throttle valve at a time. The throttle valve 26 is first rotated to full open position, after which the valve 27 is opened, followed by the valve 28. In the reverse movement, the valve 28 is closed first, followed by the valves 27 and 26 in succession.

Figure 5:
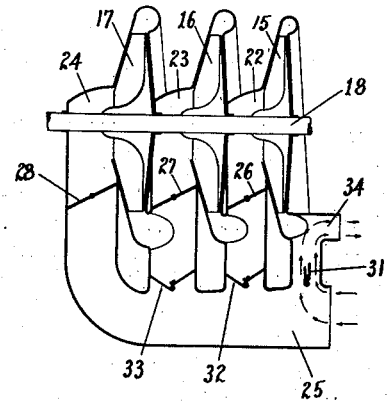
Figure 5 is a diagram showing a series of supercharger impeller casings with their throttle valves and check valves, showing by means of arrows, the air passing through the first check valve, thus by-passing the supercharger and going direct to the engine.
Figure 6:
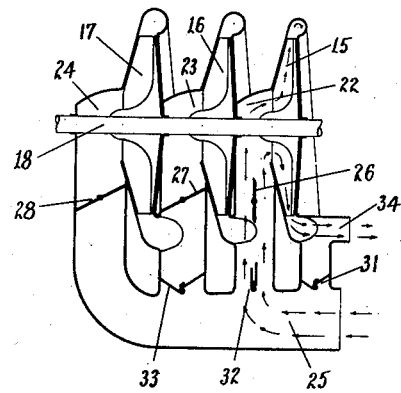
Figure 6 is a diagram similar to Figure 5 showing the air passing through the second check valve and the first impeller chamber before passing to the engine.
Figure 7:
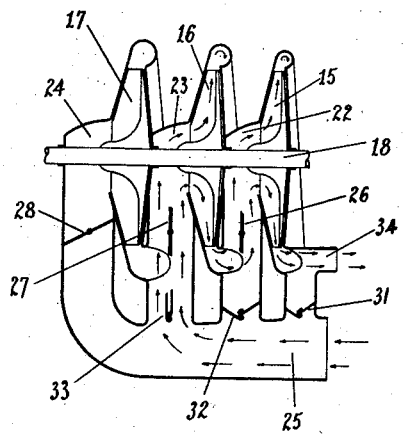
Figure 7 is a diagram similar to Figure 5 showing the air passing through the third check valve and thence through the second and first impeller chambers.
Figure 8:
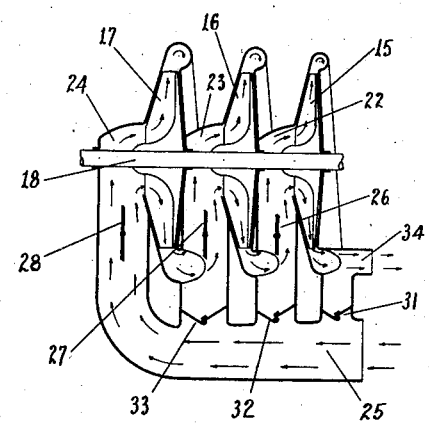
Figure 8 is a diagram similar to Figure 5 showing the air passing through the throttle valve of the third and last impeller chamber and thence through the second and first chambers to the engine.

The functioning of the above described mechanism will be better understood if reference is made to the diagrams in Figures 5, 6, 7 and 8, the first of which shows the air being by-passed direct to the engine and shows the corresponding position of the various throttle valves and check valves, while the other three diagrams show the manner in which these valves open and close and their relationship to each other in order to pass the air through the different stages of the supercharger, the various parts shown in the figures being numbered in agreement with the above description.

In the operation of this invention where full manifold pressure is maintained at all altitudes up to rated height, the number of the impellers employed, will depend upon the rated height selected.

When near sea level, if the pressure of the atmosphere is greater than the pressure at which the pressure governed control device is set to operate, the throttle valves will all be closed, and the engine will draw its supply of air through the check valve 31.

As the aircraft increases altitude the atmospheric pressure falls until it is less than the "critical" pressure of the pressure governed control device. The control then causes the rod 30 to move outwards, opening the throttle valve 26 until the first impeller 15 supplies all the air required by the engine. This air is drawn through the check valve 32. The pressure governed control device automatically adjusts the throttle 26 so that the absolute pressure of the air delivered to the engine is kept constant at the "critical" pressure to which the pressure governed control device is set. The check valve 31 now closes automatically.

As the aircraft continues to gain altitude, the atmospheric pressure continues to decrease, and the pressure governed control device continues to open the throttle 26 until an altitude is reached at which it is fully open. At this point the first impeller 15 is doing all the work of which it is capable, and in order to raise the pressure of the thinner air awaiting the aircraft at higher altitudes to the "critical" value, the second impeller 16 must come into action.

As the atmospheric pressure continues to decrease, the pressure governed control device opens the second throttle valve 27, thus allowing the second impeller 16 to draw air through the check valve 33 and deliver it to the first impeller 15 through the open throttle valve 26. The check valve 32 now closes in the same manner as 31.

As the aircraft continues to climb, the throttle valve 27 continues to open until the full open position is reached. The third throttle valve 28 then commences to open, the third impeller 17 to deliver air to the second impeller 16, and the check valve 33 closes.

Finally, when rated height is reached, all the throttle valves 26, 27 and 28 are full open and the supercharger is working at full capacity.

It should be noted that although all the impellers are constantly rotating, only those that are delivering air are consuming an appreciable amount of power.

For example, when all the throttle valves are closed the impellers are not overcoming the inertia of inflowing air by imparting to it a high rotational velocity. The power consumed by an impeller, when the throttle valve at its intake is closed, consists of a relatively unimportant amount required to overcome friction, and a small extra amount due to seepage of air through the interstices of the throttle valve. It will be observed that at all altitudes within the range of the supercharger, the pressure governed control device will maintain the "critical" pressure at the output end, regardless of all variables, including variations in R. P. M. of the engine.

It will therefore be seen that with the above design, a supercharger has been developed whereby the pilot of an aircraft is entirely relieved of worry in regard to the density of air being fed to the engine, for no matter to what height the aircraft climbs, the pressure governed control device will function to maintain the manifold pressure at a predetermined value. With the knowledge of the rated height of the engine, the stages of the supercharger will be designed to give the maximum efficiency with the least expenditure of power at varying altitudes.

With such a supercharger normal aspiration, or any desired value of manifold pressure greater than normal, will be maintained at all altitudes up to rated height, but, as only those stages of the supercharger that are actually passing air at any given moment are consuming an appreciable amount of power, wastage of power will be kept at a minimum and, consequently, greater efficiency and better performance will be obtained.

While a particular form of the device has been illustrated and described, including the valves and the mechanism through which they are operated, it will readily be understood that other forms of these parts could equally well be used to carry out the operations of this device without departing from the invention as claimed.

What I claim is:

1. In a supercharger, a series of constantly driven impellers, throttle valves controlling the entrance of air to each impeller in the series, means to control the opening of said throttle valves consecutively in agreement with the needs of the engine at varying altitudes, and check valves on the delivery side of each impeller, each being capable of admitting all the air required by the engine and bypassing the preceding impellers when their throttle valves are closed.

2. In a supercharger, a series of constantly driven impellers, throttle valves controlling the entrance of air to each impeller in the series, a control mechanism operating to open and close said throttle valves consecutively in agreement with the needs of the engine at varying altitudes, and check valves on the delivery side of each impeller, each being capable of admitting all the air required by the engine and bypassing the preceding impellers when their throttle valves are closed.

3. In a supercharger, a series of constantly driven impellers, throttle valves controlling the entrance of air to each impeller in the series, a control mechanism operating to open and close said throttle valves consecutively, a control device operating said control governed by the variation of pressure from a predetermined datum at the delivery end of the supercharger, and check valves on the delivery side of each impeller, each being capable of admitting all the air required by the engine and bypassing the preceding impellers when their throttles are closed.

4. In a supercharger, a constantly driven shaft, a series of enclosed impellers mounted on said shaft, throttle valves controlling the entrance of air to each impeller in the series, means to control the opening of said throttle valves consecutively in agreement with the needs of the engine at varying altitudes, and check valves on the delivery side of each impeller, each being capable of admitting all the air required by the engine and bypassing the preceding impellers when their throttle valves are closed.

5. In a supercharger, an engine including an intake manifold and a drive shaft, a supercharger shaft geared at a fixed ratio to said engine drive shaft, a series of enclosed impellers mounted on the supercharger shaft, throttle valves controlling the entrance of air to each enclosed impeller, means governed by the pressure of air in the intake manifold of the engine for controlling the opening of said throttle valves consecutively, and air inlet check valves on the delivery side of the impellers adapted to bypass air to the impeller next in line or to the engine when the throttle valve of the preceding impeller is closed.

6. In a supercharger, an engine drive shaft, a supercharger shaft geared at a constant ratio to said engine drive shaft, a series of enclosed impellers mounted on the supercharger shaft, a duct leading from the discharge side of each impeller to the inlet side of the impeller next in line and thence to the engine, throttle valves in the inlet side of each impeller, control means governed by the variation of pressure at the delivery end of the supercharger for opening and closing said throttle valves consecutively, and air inlet check valves on the delivery side of the impellers adapted to bypass air to the impeller next in line or to the engine when the throttle valve of the preceding impeller is closed.

GRETTIR ALGARSSON.